(No Model.) 7 Sheets—Sheet 1.

F. HELLER & I. G. HOOPER.
MACHINE FOR FORMING BALLS, &c., FROM PLASTIC MATERIAL.

No. 379,068. Patented Mar. 6, 1888.

WITNESSES:

INVENTORS:
Irvin G. Hooper
and
Frederick Heller,
BY Campbell & Co. ATT'YS.

(No Model.) 7 Sheets—Sheet 2.
F. HELLER & I. G. HOOPER.
MACHINE FOR FORMING BALLS, &c., FROM PLASTIC MATERIAL.
No. 379,068. Patented Mar. 6, 1888.

WITNESSES:

INVENTORS:
Irvin G. Hooper,
and
Frederick Heller,
BY Campbell & Co ATT'YS.

(No Model.) 7 Sheets—Sheet 4.

F. HELLER & I. G. HOOPER.
MACHINE FOR FORMING BALLS, &c., FROM PLASTIC MATERIAL.

No. 379,068. Patented Mar. 6, 1888.

WITNESSES:

INVENTORS
Irvin G. Hooper
and
Frederick Heller
BY Campbell & Co. ATT'YS.

(No Model.) 7 Sheets—Sheet 5.

F. HELLER & I. G. HOOPER.
MACHINE FOR FORMING BALLS, &c., FROM PLASTIC MATERIAL.

No. 379,068. Patented Mar. 6, 1888.

WITNESSES:

INVENTORS:
Irvin G. Hooper
and
Frederick Heller,
BY Campbell & Co ATT'YS.

(No Model.) 7 Sheets—Sheet 6.

F. HELLER & I. G. HOOPER.
MACHINE FOR FORMING BALLS, &c., FROM PLASTIC MATERIAL.

No. 379,068. Patented Mar. 6, 1888.

WITNESSES:

INVENTORS:
Irvin G. Hooper,
and
Frederick Heller,
BY Campbell & Co. ATT'YS.

(No Model.) 7 Sheets—Sheet 7.

F. HELLER & I. G. HOOPER.
MACHINE FOR FORMING BALLS, &c., FROM PLASTIC MATERIAL.

No. 379,068. Patented Mar. 6, 1888.

WITNESSES:

INVENTORS:
Irvin G. Hooper,
and
Frederick Heller,
BY Campbell & Co. ATT'YS.

UNITED STATES PATENT OFFICE.

FREDERICK HELLER AND IRVIN G. HOOPER, OF NEWARK, NEW JERSEY; SAID HOOPER ASSIGNOR TO SAID HELLER.

MACHINE FOR FORMING BALLS, &c., FROM PLASTIC MATERIAL.

SPECIFICATION forming part of Letters Patent No. 379,068, dated March 6, 1888.

Application filed May 26, 1887. Serial No. 239,401. (No model.)

*To all whom it may concern:*

Be it known that we, FREDERICK HELLER and IRVIN G. HOOPER, citizens of the United States, residing at Newark, in the county of Essex and State of New Jersey, have invented certain new and useful Improvements in Machines for Forming Balls, &c., from Plastic Material; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a machine for forming or shaping plastic material of any kind into balls, globular or other solid forms, the accompanying drawings illustrating the construction of said machine, and the following description indicating the mode of operation thereof, while the claims appended specify those features in said machine which are original with us.

Figure 1:
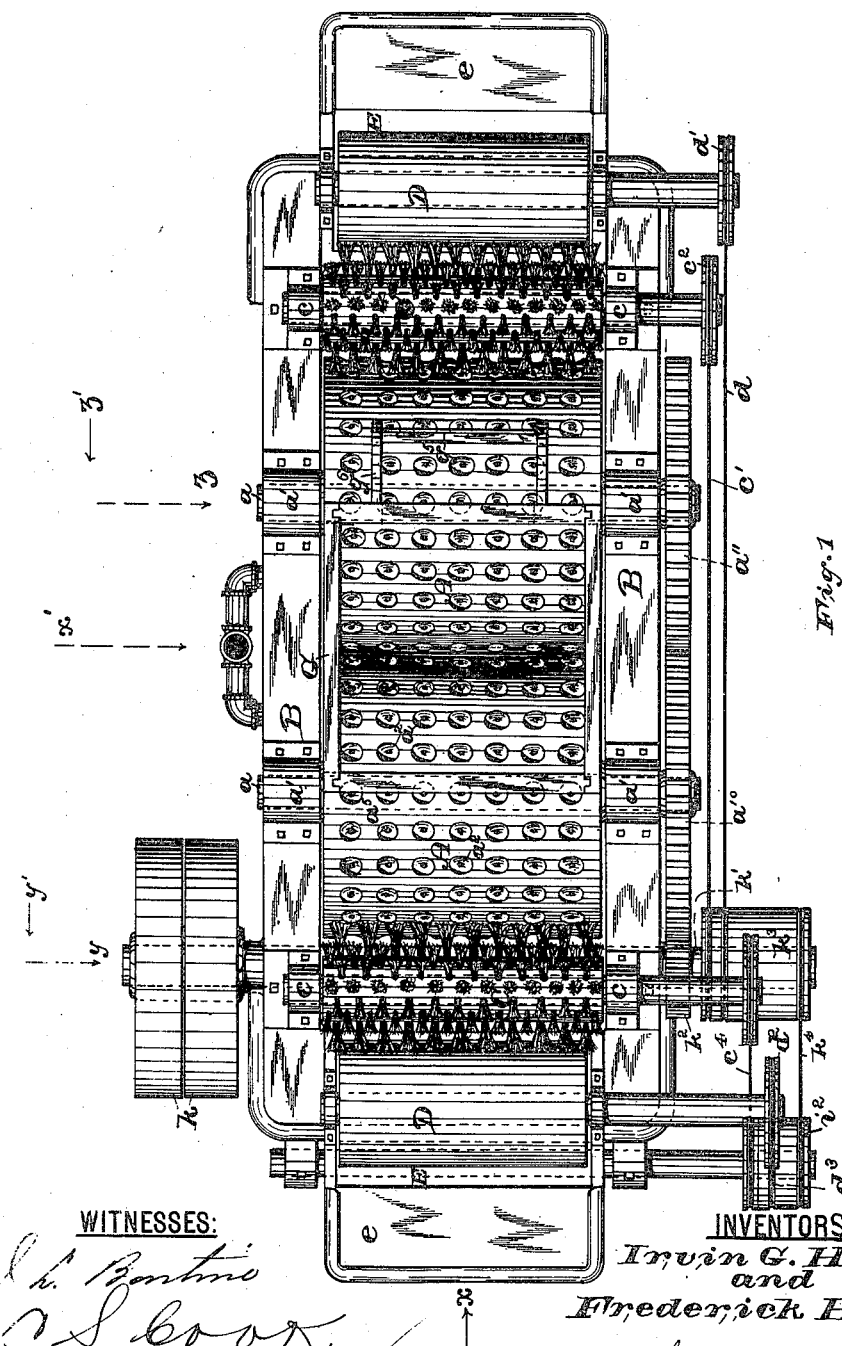
Figure 2:
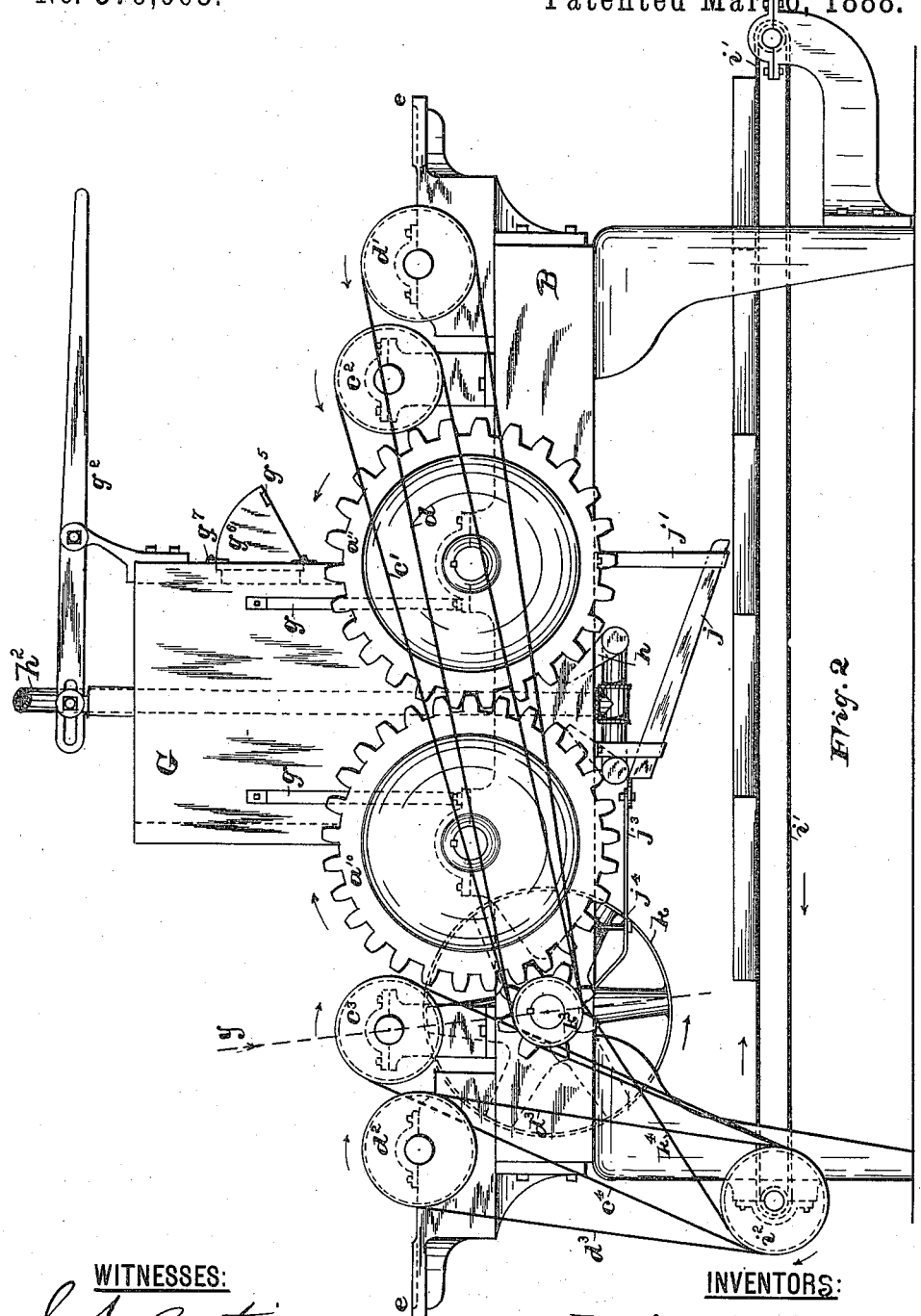
Figure 3:
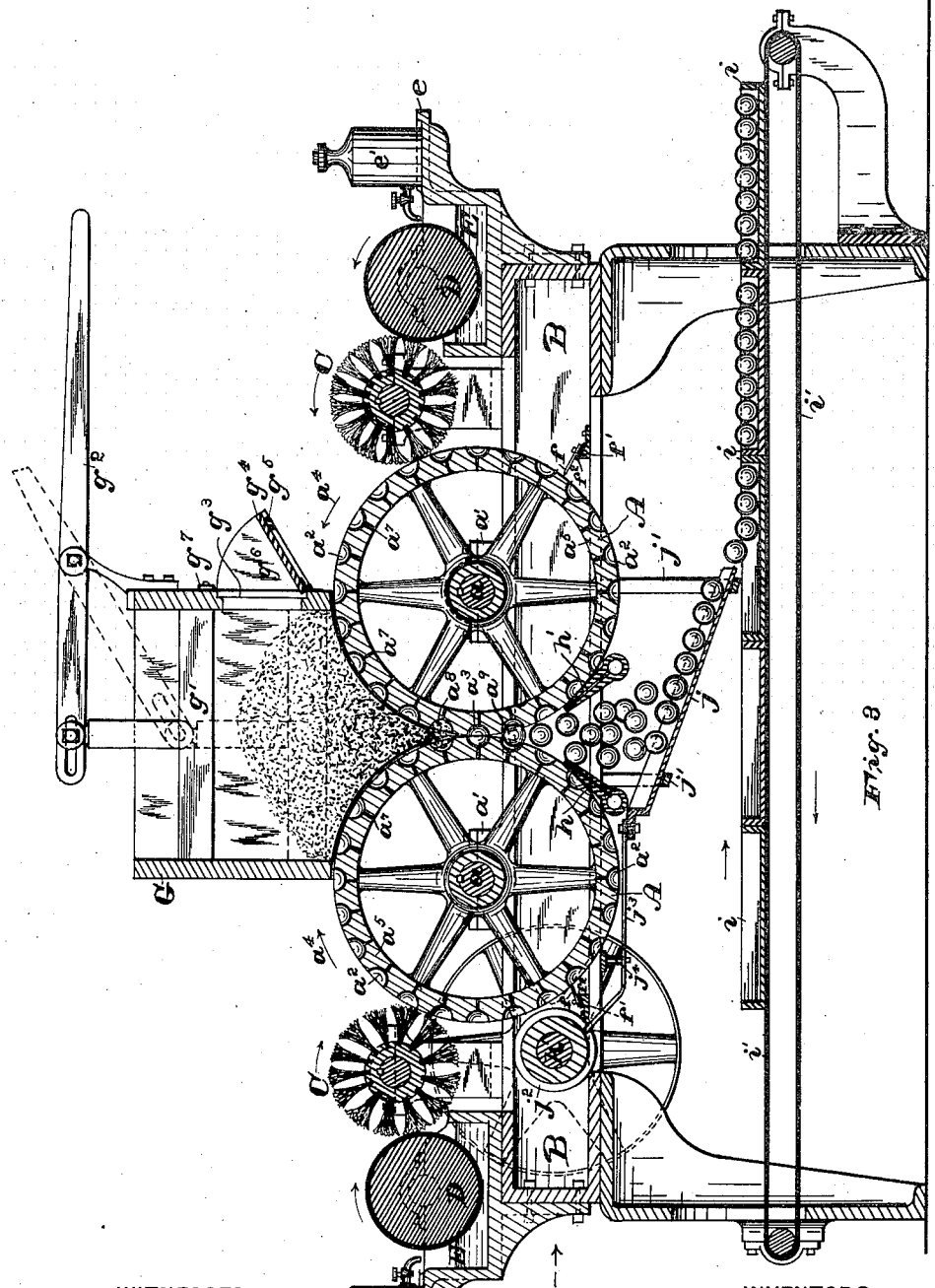
Figure 4:
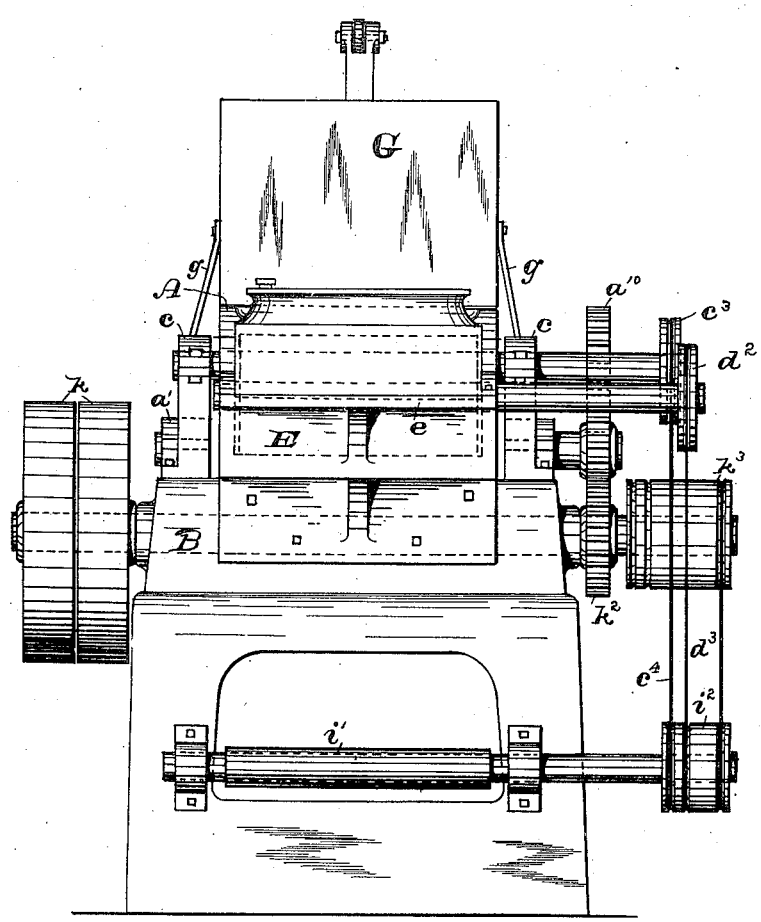
Figure 5:
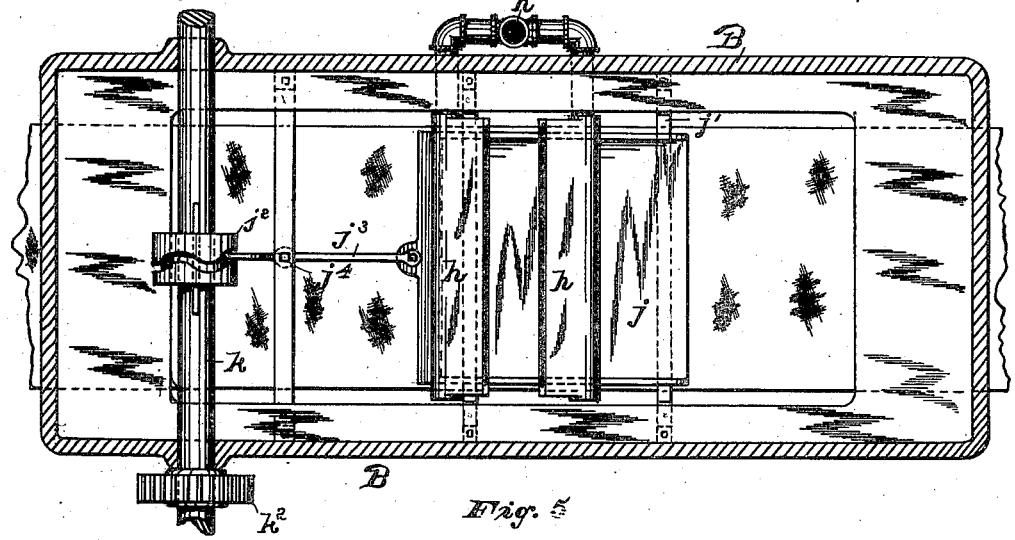
Figure 6:
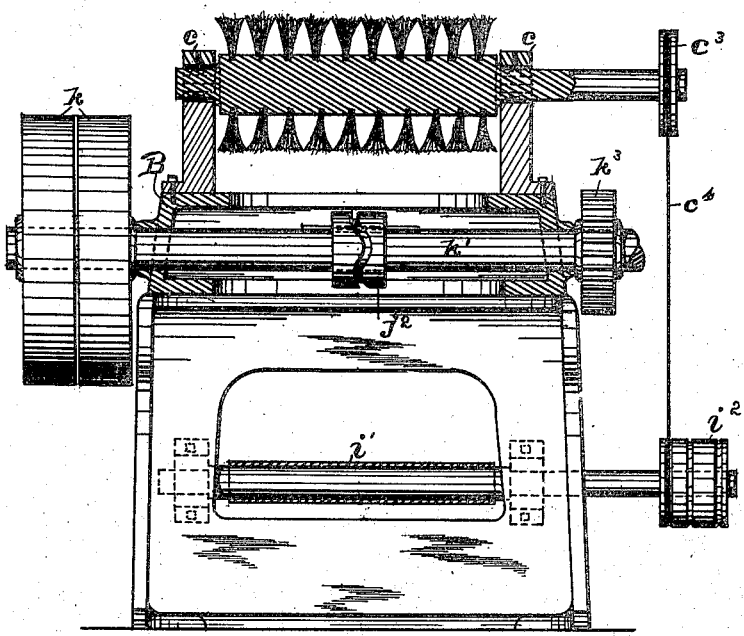
Figure 7:
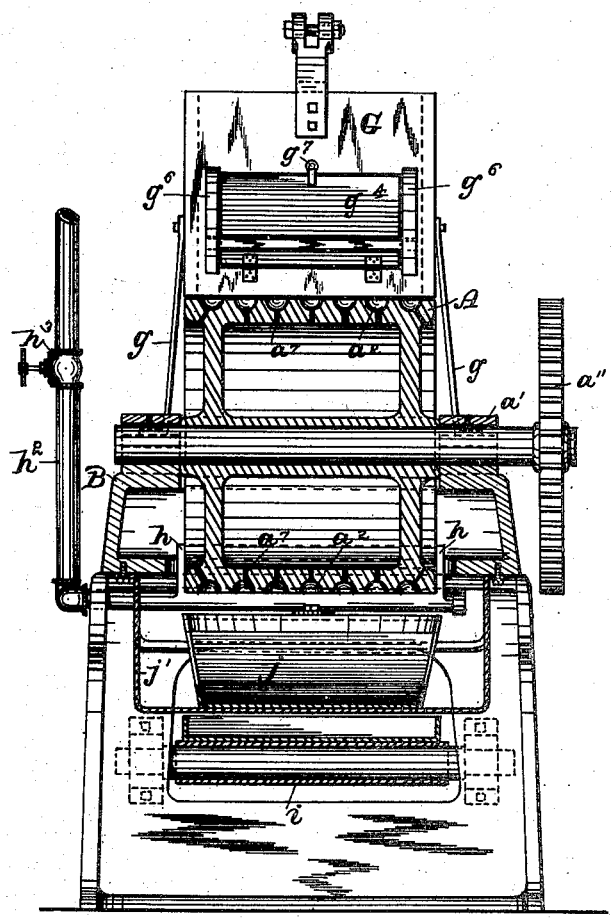
Figure 8:
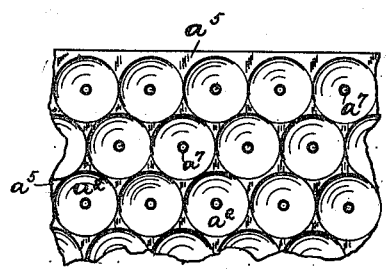
Figure 9:
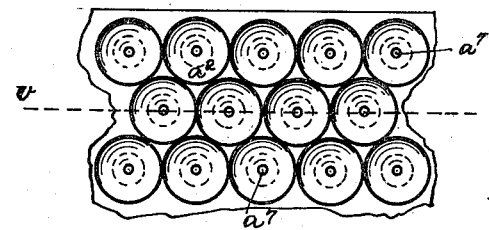

In the said drawings, Figure 1 is a plan of our improved machine. Fig. 2 is a side elevation of said machine, looking toward that side thereof on which the driving belts and pulleys are arranged. Fig. 3 is a longitudinal section of said machine, taken centrally therethrough; and Fig. 4 is an end view looking in the the direction of the arrow $x$, Fig. 1. On Sheet 5, Fig. 5 is a sectional view taken through line $u$, Fig. 3, the forming-rolls being omitted from the view. Fig. 6 is a section through $y$, Figs. 1 and 2; and Fig. 7 is a section taken through $z$, Fig. 1, looking in the direction of the arrow $z'$. Fig. 8 on Sheet 9 is an enlarged plan of a few of the cavities in the forming-cylinder. Fig. 9 is a view similar to Fig. 8, showing another construction of the said cavities; and Fig. 10 is a sectional view taken through $v$, Fig. 9, of the forming-cavities, illustrating the relation thereof.

In said views similar letters of reference are employed to indicate corresponding parts.

In said above-described views, A designates the ball or globule forming cylinders, which turn in suitable journals, $a$, in boxes $a'$ on the bed B of the machine. In the periphery of said cylinders are formed or arranged semi-spherical or semi-polyhedrical cavities $a^2$, which are so placed on each of the cylinders that each cavity on one of said cylinders corresponds or coincides with a second cavity on the other cylinder as they both revolve, thus forming by the coincidence of said semi-spherical or semi-polyhedrical cavities a spherical or polyhedrical cavity, as indicated at $a^3$, where the two cylinders touch as they revolve in the direction of the arrows $a^4$. The semi-spherical cavities on each cylinder are preferably alternately arranged, as in Figs. 8 and 9, to enable as large a number as possible to be grouped on the cylinders; but they may also be relatively placed, as shown in Fig. 1.

Figure 10:
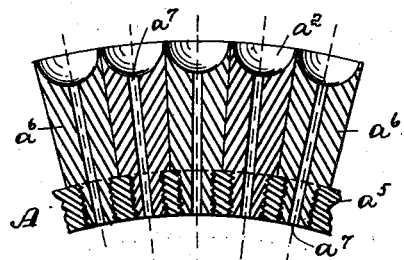

As indicated in Figs. 3, 7, and 8, the ball or polyhedron forming cavities are formed in the solid periphery $a^5$ of the cylinders, or in an annular plate secured to the cylinders; but instead of thus forming the cavities each one thereof may be cut independently of the other in the end of a cylindrical bar, $a^6$, Fig. 10, which is threaded and screwed into the said cylinder A. To permit the said bars $a^6$ to be closely grouped together, they are preferably tapering on their threaded ends, conforming to the radial lines of the forming-cylinder, as in Fig. 10. These various constructions and arrangements indicate some of the methods according to which the ball-forming cavities may be made, to none of which, however, do we wish to limit the invention.

Leading from each or both of the semispherical cavities is a duct or opening, $a^7$, through which the air may escape when any two of the said semispherical cavities come together, and are filled with the plastic material, as shown at $a^3$ and $a^8$, and also at $a^9$, Fig. 3, where a newly-formed ball is indicated as just being dislodged from the forming-cavities.

On opposite sides of the forming-cylinders A are arranged lubricating-brushes C, journaled in boxes $c$ on the bed-frame of the machine, said brushes rubbing against the felt-covered rolls D, which revolve in the oil-containing tanks E, which may be provided with a shelf, $e$, to hold an oil-can, $e'$, from which the oil may be allowed to drip slowly into the reservoir and thus maintain a constant supply therein.

Beneath each of the forming-cylinders A are scrapers or doctors $f$, which are bolted to the brackets $f'$, which are in turn secured to the bed B of the machine, a rubber plate or block, $f^2$, being inserted between the doctor $f$ and the bracket $f'$, as shown in Fig. 3, to provide a yielding resistance to the scraper when in contact with the cylinders A.

For feeding or conducting the plastic material to the forming-cylinders various devices have been invented by us, two of which we will now describe. That shown in Figs. 1, 2, and 3 consists of a hopper, G, which is supported directly above the cylinders A by rods $g$, bolted to the bed of the machine, as indicated in Figs. 2 and 7, and the inside diameter of which is about the width of the rolls or cylinders, as shown in Fig. 1, so as to direct the plastic material properly down between the said cylinders.

As is indicated in Fig. 3, the material from which the balls or globules or other polyhedrical forms are to be made rests directly upon the top of the cylinders and constantly keeps the cavities $a^2$ filled, and also presses down between the forming-cylinders, as shown in Fig. 3, so that as the said cylinders revolve toward each other in the direction of the arrows $a^4$ the material is drawn down between the cylinders, filling the cavities, and is dropped from the said cavities as the cylinders continue to revolve in the form of spherical bodies, as shown in Fig. 3.

Instead of employing merely the weight of the material to fill the cavities, a piston, $g'$, may be arranged in the hopper, operated by a pivoted lever, $g^2$, and the said material fed into the side of the hopper through an opening, $g^3$, which is closed by a door, $g^4$, and which when open rests upon a brace, $g^5$, extending between the side pieces, $g^6$, as shown in Figs. 1, 2, 3, &c. The door when closed is held by a button, $g^7$, and thus acts to prevent the escape of the plastic material through the opening $g^3$.

Instead of the hopper above described, we have contemplated using a traveling belt arranged above and leading down to either one of the cylinders between suitable guides, and instead of feeding the plastic material to the said cylinders in the form of a pasty mass, it may be prepared in the form of flat strips and fed down between the cylinders over the said belt.

These different methods and forms of construction for feeding the plastic material to the forming-cylinders serve to illustrate some of the devices which we may use to feed the said material.

To prevent the adhesion of the newly-formed balls to the forming-cylinders and insure their separation, we have arranged blast-nozzles $h'$ $h'$ beneath the forming-cylinders and pointing up toward the point of contact of said cylinders, so that the air-currents strike the sides of the balls at such an angle as to lift them from the cavities $a^2$. The blast is supplied to the nozzles or tuyeres from the pipe $h^2$, which is provided with a valve, $h^3$, therein to regulate the force of the blast. The balls, after leaving the forming-cylinders, may be caught in a stationary tray held beneath said cylinders; or a series of trays, $i$, carried by a traveling belt, $i'$, may be caused to pass beneath the cylinders at a proper rate of speed, and the filled trays removed from one end of the belt, while the empty trays are placed upon the opposite end of said belt.

To prevent the balls from piling upon each other in the trays, a shifting or shaking device may be used to receive the said balls and distribute them upon the trays. The shaking or distributing device shown in the drawings consists of an inclined chute, $j$, hung loosely on brackets $j'$ and operated by a grooved cam, $j^2$, on the main shaft, through a lever, $j^3$, pivoted at $j^4$ to the bed B, one end of which engages with the groove in the cam $j^2$ and the other end being pivotally secured to the chute $j$, as indicated in Fig. 3. By the use of this inclined and vibrating chute the balls are not only distributed over the trays, but their fall from the cylinders to the trays is broken, and there is less liability of any damage to the balls, particularly when made of a plastic material, which does not harden quickly.

In Figs. 1 and 2 particularly is indicated the driving mechanism for the various moving parts of the machine, the directions of movement being indicated by arrows placed contiguous to each of said moving parts. The said driving mechanism consists of the fast and loose driving-pulleys $k$ on the main shaft $k'$, on which is keyed a pinion, $k^2$, which meshes with a gear-wheel, $a^{10}$, which meshes in turn with a second gear-wheel, $a^{11}$, both of said gears $a^{10}$ and $a^{11}$ being secured and imparting motion to the forming-cylinders, as will be understood by reference to Figs. 2 and 3. On the main shaft is also a grooved pulley, $k^3$, from which runs the belts or cords $c'$ and $d$, which encompass the grooved pulleys $c^2$ and $d'$ on the brush $c$ and felt roll D, respectively, as in Figs. 1 and 2. Connecting the said grooved pulley $k^3$ with a grooved pulley, $i^2$, which actuates the traveling belt $i'$, is a cross-belt, $k^4$, and extending from said pulley $i^2$ to the pulleys $c^3$ and $d^2$ are cords or belts $c^4$ and $d^3$. (Shown in Fig. 2.)

As will be understood, the size of the ball-forming cavities may vary, and also the number thereof on the cylinder, according to the capacity desired in the machine.

In lieu of employing an air-blast to expel or dislodge the balls from the cavities should they adhere therein, we have contemplated using a continuous band of rubber encircling each of the forming-cylinders outside and around the said cavities. The weight of the plastic material in the hopper will press the rubber down into the cavities, and as the cylinders revolve the elasticity of the rubber bands in returning to their normal position will expel each ball from its forming-cavity.

The brush-cylinder is provided with either stiff or pliable bristles or coverings which distribute the oil upon the forming-cylinders A, and when stiff bristles are employed the oil is spattered or sprayed over the cylinders. In lieu of the brush and felt roll for applying the oil to the cylinders A, we may employ an inspirator of any suitable construction, by which the oil is sprayed over the cylinders.

While we have illustrated in the drawings and our description refers more frequently for convenience to a semi-spherical cavity in the forming-cylinders, still it is our intention and we have contemplated using other forms—as, for instance, polyhedrical forms, oval, lozenge, conical, and other forms which are capable of being so divided as that each of the forming-cylinders can shape them up by the coincidence of the cavities.

By reference to Fig. 5 it will be seen that the nozzles h are so formed as to extend the entire width of the forming-cylinders, thereby directing the blast of air against all of the balls.

We may use instead of the single broad nozzle a number of separate tubes to direct the air-currents against each annular row of balls.

Having thus set forth our invention, we desire to claim the following:

1. In a machine for making solid forms from plastic material, the combination, with contiguously-arranged forming-cylinders provided with forming-cavities on the peripheries thereof which coincide as said cylinders revolve and form inclosed cavities at the point of contact of said cylinders, of blast-nozzles or tubes arranged beneath said forming-cylinders and so placed as to cause the air-blast to dislodge the formed bodies from their forming-cavities, for the purposes set forth.

2. In a machine for making solid forms from plastic material, the combination of contiguously-arranged forming-cylinders provided with forming-cavities on the peripheries thereof, which coincide as said cylinders revolve and form inclosed cavities at the point of contact of said cylinders, each of said forming-cavities being provided with an air-duct leading therefrom, and an oiling device for applying a suitable lubricant to the peripheral surface of each of said cylinders, for the purposes set forth.

3. In a machine for making solid forms from plastic material, the combination of contiguously-arranged forming-cylinders provided with forming-cavities on the peripheries thereof which coincide as said cylinders revolve and form inclosed cavities at the point of contact of said cylinders, each of said cavities being provided with an air-duct leading therefrom, distributing brush-rolls placed contiguous to said forming-cylinders, oil-rolls engaging with said distributing-rolls, and an oil-tank in which said oil-rolls revolve, for the purposes set forth.

In testimony that we claim the invention set forth above we have hereunto set our hands this 17th day of May, 1887.

FREDERICK HELLER.
IRVIN G. HOOPER.

Witnesses:
FREDK. C. FRAENTZEL,
FREDK. F. CAMPBELL.